United States Patent [19]

Pourboghrat

[11] Patent Number: 5,519,623
[45] Date of Patent: May 21, 1996

[54] IMPROVED BENDING MACHINE AND A METHOD FOR BENDING A PART

[75] Inventor: Farhang Pourboghrat, Pittsburgh, Pa.

[73] Assignee: Aluminum Company of America, Pittsburgh, Pa.

[21] Appl. No.: 516,042

[22] Filed: Aug. 17, 1995

Related U.S. Application Data

[62] Division of Ser. No. 310,238, Sep. 21, 1994.
[51] Int. Cl.$^6$ .............................. G06F 19/00; B21D 11/00
[52] U.S. Cl. ........................................ 364/474.07; 72/149
[58] Field of Search ................................ 364/474.07:476;
72/149–155, 7, 8, 10, 11, 21, 22, 23, 369,
8.1, 8.3, 8.4, 8.6, 9.5, 10.1, 10.2, 10.4,
11.1, 11.2, 11.4, 12.3, 16.1, 16.2, 16.6,
17.3, 18.1, 18.4, 21.1, 21.4

[56] References Cited

U.S. PATENT DOCUMENTS

| | | | |
|---|---|---|---|
| 3,821,525 | 6/1974 | Eaton et al. | 364/474.07 |
| 4,130,004 | 12/1978 | Eaton | 72/151 |
| 5,050,089 | 9/1991 | Stelson et al. | 364/474.07 |
| 5,343,725 | 9/1994 | Sabine | 72/155 |

Primary Examiner—Roy N. Envall, Jr.
Assistant Examiner—Steven R. Garland
Attorney, Agent, or Firm—David V. Radack; Thomas R. Trempus

[57] ABSTRACT

A method for determining a bending die radius of a bending machine for bending a part and an associated apparatus. The method involves entering into a computer data concerning the part to be bent and an initial estimate of the radius of the bending die. Based on the data related to the part and the initial estimate, a final value for the die radius is determined. An improved bending machine and an associated method are also disclosed.

19 Claims, 8 Drawing Sheets

IMPROVED BENDING MACHINE AND A METHOD FOR BENDING A PART

This is a division of application Ser. No. 08/310,238 filed Sep. 21, 1994.

BACKGROUND OF THE INVENTION

This invention relates to a method for determining the radius of a bending die for use with a bending machine for bending a part and an associated apparatus. The invention also includes an improved bending machine and a method of bending a part.

Bending machines for bending parts, such as aluminum extrusions, are well known. In order to bend a part to a desired final shape, a bending die is used. Bending dies are used in both rotary draw bending and in stretch die bending.

In designing extrusions for use in, for example, automobiles, the part designer usually specifies a final bend angle and a radius of curvature for the part. These specifications are given to the bending machine designer so that he can design a bending die and determine process parameters (i.e., amount of torque, tension in the part) that will produce a part that meets the part designer's specifications. The bending machine designer must determine a bending die radius and must also calculate how much to "overbend" the part in order to compensate for "springback" when the part is unloaded from the bending machine.

Design of the bending die and control of the process parameters traditionally relied on experience and intuition of the bending machine designer and the bending machine operator. Because of this, there were relatively involved "trial-and-error" preproduction experiments to determine die geometrics and process parameters. These preproduction experiments were not only time consuming and imprecise, but also involved expensive die proofing and die modifications in many cases.

What is needed, therefore, is a method that facilitates designing a bending die that can be used on a bending machine for bending a part to a desired shape without the need for extensive experimentation, die proofing and die modification.

Furthermore, once the bending die is designed, and the process parameters determined, there is also a need for an improved bending machine that controls the bending process based on the previous method of determining the bending die radius.

Typically, rotary die bending machines include a stationary portion and a rotary bending die portion which rotates relative to the stationary portion. The part to be bent is clamped to both the stationary portion and the rotary die. After clamping, the rotary bending die is rotated relative to the stationary portion. Because the part is clamped to the rotary die, the part is drawn along with the bending die causing a bend to be formed in the part. See, for example, U.S. Pat. No. 3,821,525, which is expressly incorporated herein by reference.

As is well known, after the part has been bent and unloaded from the bending machine, the part will "springback" to a different bend angle. In order to obtain a desired final bend angle, this springback must be compensated for by "overbending" the part. Determining the amount of overbending to produce a final desired unloaded bend angle typically involved operator intuition, experience and "feel".

U.S. Pat. No. 5,050,089 discloses an online, automatically compensated tube bender which compensates for springback. This patent discloses a sensor for measuring the bending moment and calculating the springback angle of the tube being bent as a function of the bending moment determined during bending. This patent, however, is limited to tubular type of parts and only takes into account the bending moment and is not useful for parts having complex cross-sectional shapes.

What is also needed, therefore, is an improved bending machine and an associated method which facilitates bending of parts having a wide range of mechanical properties and which has any cross-sectional shape.

SUMMARY OF THE INVENTION

The inventions have met the above mentioned needs. A method is disclosed for determining a desired radius for a bending die to be used in a bending machine for bending a part to a desired unloaded bend angle. The method comprises entering into an electronic processing means, such as a computer, the following: (i) a desired unloaded centerline curvature for the part; (ii) data related to the cross-sectional shape of the part; (iii) an initial estimate of the bending die radius; (iv) an initial estimate of a loaded bend angle for the part; (v) mechanical properties of the part; (vi) the thickness of the part; (vii) tension at a first boundary section; (viii) conditions related to the variation in tension or variation in shear at the first boundary section of the part and variation in tension or variation in shear at a second boundary section; and (ix) an initial estimate of a contact pressure variation of the bending die against the part. Once these items are entered into the computer, the deformation of the part during the bending is determined and the computer, based on the deformation, calculates an unloaded centerline curvature for the part after the part has been bent and is removed from the bending machine. The computer then compares the calculated unloaded centerline curvature to the desired unloaded centerline curvature entered above and based on that comparison, the desired radius for the bending die is determined.

The apparatus of the invention comprises electronic processing means for receiving data related to the design of the bending die as set forth in subparagraphs (i) through (ix) above. The electronic processing means further has means for determining deformation of the part during bending of the part, means for calculating an unloaded centerline curvature for the part and means for comparing the calculated unloaded centerline curvature with the desired unloaded centerline curvature from which comparison the desired bending die radius is determined. The apparatus further comprises means for employing the desired radius for the bending die in manufacturing a bending die having a desired radius.

A rotary draw bending machine for bending a part is also disclosed. The rotary draw bending machine comprises a stationary portion and bending die means adapted to rotate relative to the stationary portion. A pressure holder means is also provided for holding at least a portion of the part against the stationary portion by applying a pressure holder force on a first end section of the part and clamp holder means for holding at least a portion of the second end section against the bending die means by applying a clamping force on the second end section of the part. The rotary draw bending machine further comprises means for adjusting the pressure holder force while maintaining a substantially constant tension at the boundary section. In this way, the part is bent to a desired configuration.

An associated method of bending a part to a desired configuration is also disclosed. The method comprises providing a rotary draw bending machine substantially as set forth above and clamping a first end section of the part against the stationary portion of the bending machine and clamping a second end section of the part against the bending die means of the rotary bending machine. The method further comprises rotating the bending die means relative to the stationary portion and during rotation, adjusting the pressure holder force against the first end section of the part. In this way, the part is bent to desired configuration.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENTS

As mentioned above, a designer of a part, such as an aluminum extrusion, usually specifies a final bend angle and a desired unloaded centerline curvature for the extrusion. These specifications, along with data related to the cross-sectional shape and the mechanical properties of the extrusion, are given to a bending machine bending die designer to calculate the die radius and the process parameters necessary to obtain the desired final unloaded bend angle and unloaded radius of curvature of the extrusion. Prior art methods involved intuition, experience and costly trial and error preproduction die proofing. The invention disclosed herein provides a method for modelling the bending process and thus eliminates the uncertainty and expense of prior art trial and error methods.

Referring to FIGS. 1–4, a flow chart of the computer software used for determining the radius of a bending die for use with a bending machine for bending a part, such as an extrusion, is shown. It will be appreciated that the computer software is stored and is run on any suitable electronic processing means, such as a personal computer, for example. The actual source code for the computer software can be made from the flow chart by one skilled in the art.

Figure 1:
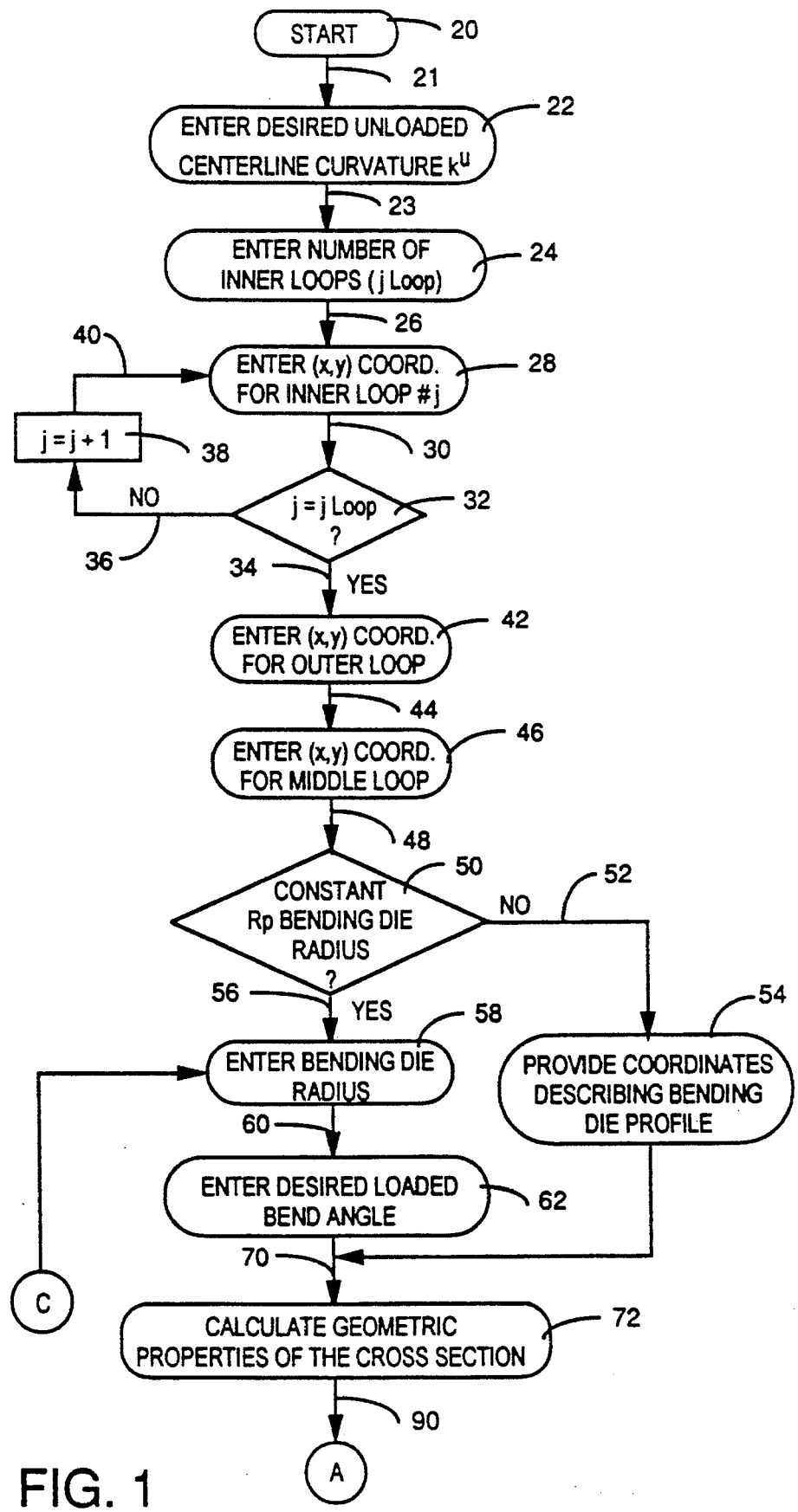
FIGS. 1, 2, 3 and 4 are a flow chart for the computer program that is used to determine a radius of the bending die for a bending machine to bend a part to a desired shape.

Referring now more particularly to FIG. 1, after the start 20 of the program, line 21 leads to box 22 where the user is asked to enter into the computer a desired unloaded centerline curvature ($k''$) for the part. This value is known by the designer from the information provided to the designer from the part designer. After this, line 23 leads to box 24 where the program begins to ask the user for coordinate data related to the cross-sectional shape of the part. The example of a part that will be used throughout this specification will be an aluminum extrusion although it will be appreciated that any part or extrusion, having simple or complex cross-sectional shapes and any type of material properties can be used as the part to be bent.

Figure 5:
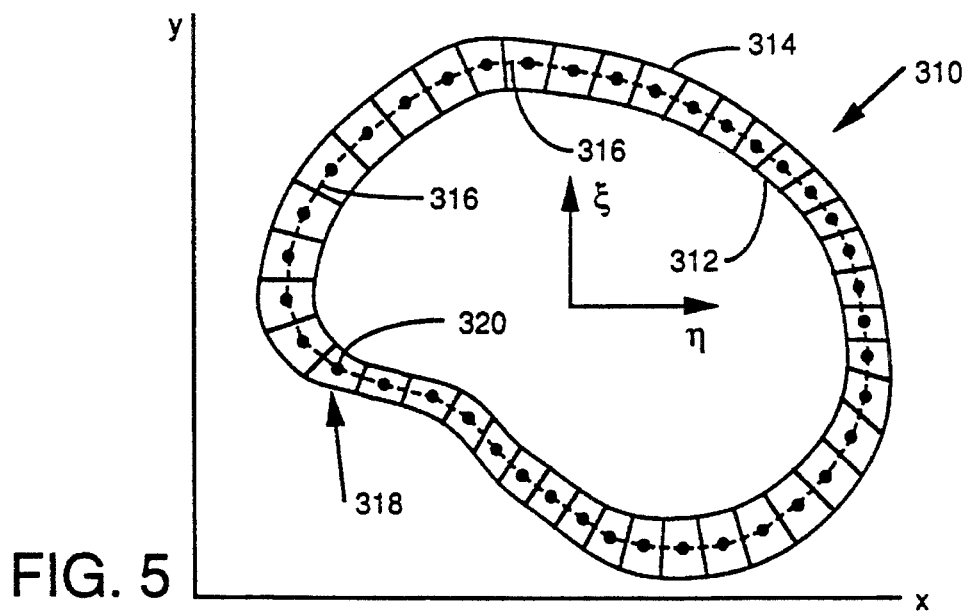
FIG. 5 is a cross-section of the part to be bent disposed in an x-y coordinate plane and showing the discritizing of the cross-section as well as the coordinates of the outer, middle and inner loops of the part.

Referring to FIG. 5, a cross-section of an extrusion 310 is shown disposed in a quadrant of an x-y Cartesian plane. As is known to those skilled in the art, each point on the inner loop 312, outer loop 314 and middle loop 316 is given an x-y coordinate reference. The middle loop 316 is formed by first discritizing the extrusion into a number of segments, such as segment 318. The midpoint 320 of the segment 318 is calculated through an estimation process well known to those skilled in the computer aided design ("CAD") art. Because the thickness of the part is thin relative to the other dimensions of the part, such as its height and width, the error associated with the estimation of the midpoint is negligible. The midpoints of all the segments are joined by middle loop 316.

It will be appreciated that the invention is not limited to extrusions having just one inner loop. For example, referring to FIG. 6, that extrusion 321 has an outer loop 322, and a middle loop 324 which consists of one x-y coordinate file along with three inner loops 326, 328 and 329. Thus, the program can be used with extrusions having any cross-sectional shape.

Figure 6:
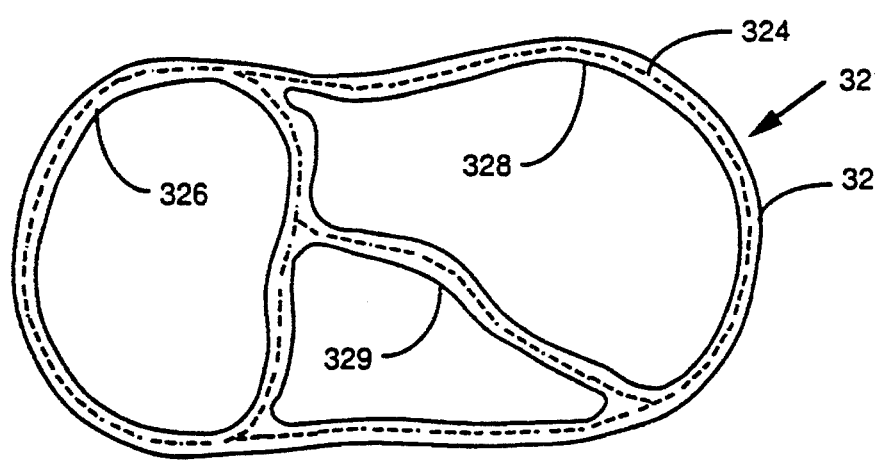
FIG. 6 is a cross-sectional view of another part disposed in an x-y coordinate plane and showing three inner loops in the part.

Referring back to FIG. 1, box 24 asks the user to enter into the program the number of inner loops. For the extrusion shown in FIG. 5, the user would enter one (1) inner loop and for the extrusion shown in FIG. 6, the user would enter three (3) inner loops. After this, the program proceeds by line 26 to box 28 which asks the user to enter coordinate data for the first inner loop. Once this is done, the program proceeds by line 30 to decision box 32, wherein it is determined whether the "jth" inner loop has been entered. For FIG. 5, for example, there is one inner loop thus j loop is equal to 1. Once the inner loop coordinate data for the inner loop is entered, the decision box 32 determines that j=j loop and the program proceeds out of box 32 by line 34. In the case of FIG. 6, there are three (3) inner loops, so after the first inner loop is entered, the decision box 32 determines that j≠j loop and thus the program proceeds by line 36 to the incremental counter box 38 which in turn increases the inner loop counter to j+1 or 1+1 or the second inner loop, which information is fed back to box 28 by line 40. This process is repeated until all inner loop coordinate data is entered.

Once the inner loop data is entered, the program proceeds by line 34 to box 42 where the x-y coordinates of the outer loop are entered and then after this the program proceeds by line 44 to box 46 where the x-y coordinates of the middle loop are entered.

It will be appreciated that the coordinate data can be entered manually, but in most cases will be provided in a file which is merely inputted into the program, and thus the coordinate data entry steps discussed above can be bypassed.

After all of the x-y coordinate data is entered, the program proceeds by line 48 to a decision box 50 where the user must enter whether or not constant bending die radius bending is desired If the answer is "no" the program proceeds by line 52 to box 54 where the coordinates of the bending die profile are entered. The bending die profile can be described by using x-y coordinates of the points describing the profile. The technique for calculating curvature and bend angle from x-y coordinates is well known to those skilled in the art. If the answer from decision box 50 is "yes", the program proceeds by line 56 to box 58 where the bending die radius is entered and then by line 60 to box 62 where the desired loaded bend angle of the part is entered.

Figure 2:
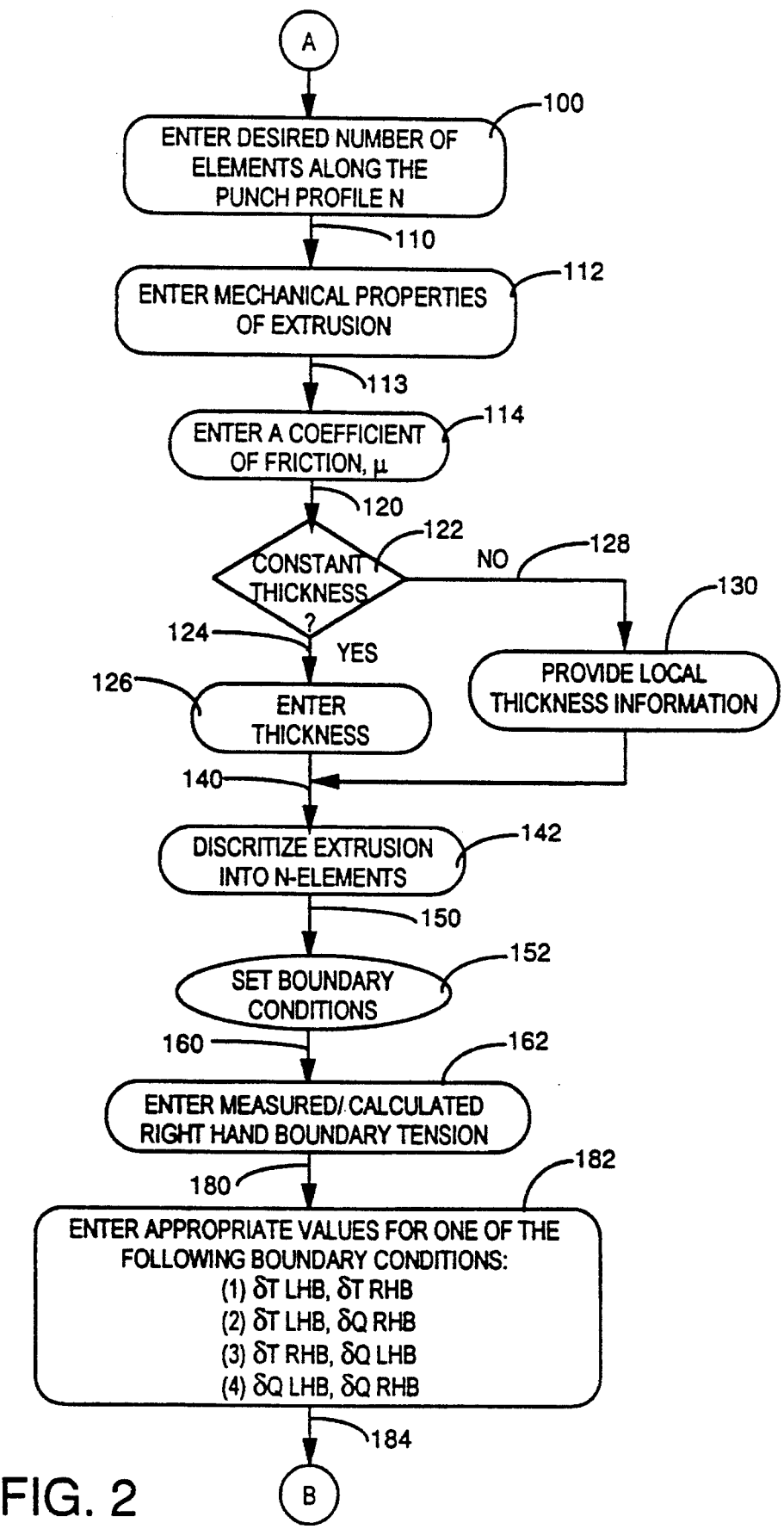

Once the bending die profile is entered, the program proceeds by line 70 to box 72 where the computer calculates the geometric properties of the cross-section. This includes, generally, calculating area, the stiffness of the cross-section and the height of the extrusion. The technique for calculating geometric properties is well known to those skilled in the CAD art. After these geometric properties are calculated, the program proceeds by line 90 to box 100 (FIG. 2).

Figure 7:
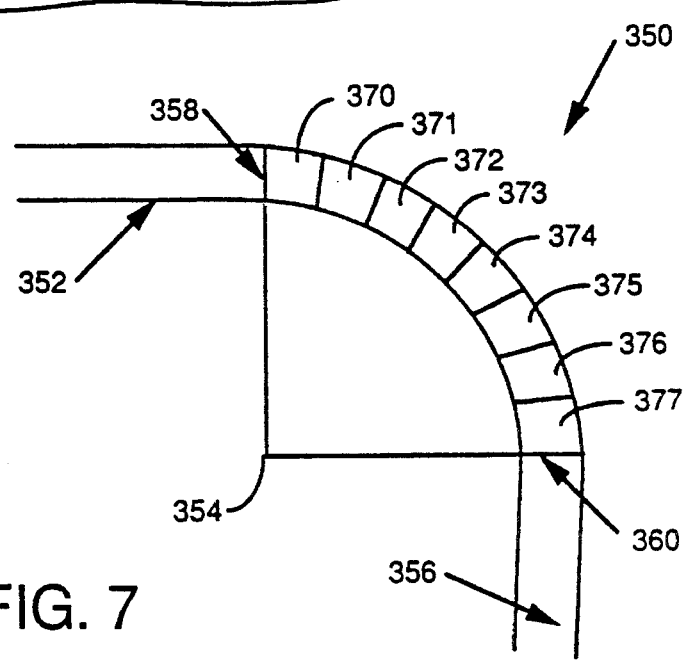
FIG. 7 is a schematic diagram showing a part that is bent and showing the intermediate bent section being divided into N-elements as required in the computer program.

In box 100, the user enters the desired number of discrete elements that the bent section of the extrusion is divided into and assigns that number of discrete elements a value N. Referring now to FIG. 7, an extrusion 350 is shown. This extrusion 350 has a first end section 352, an intermediate bent section 354 and a second end section 356. The extrusion 350 also includes a first boundary section 358 disposed between the first end section 352 and intermediate bent section 354 and a second boundary section 360 disposed between the second end section 356 and the intermediate bent section 354. These boundaries are determined from the information provided regarding the die profile.

The intermediate bent section 354 is divided into a desired number of elements, in this case eight (8) elements, 370, 371, 372,373,374,375, 376, and 377. It will be appreciated that any number of elements can be used, however, the more elements that are used the longer the computation time will be. Therefore, the optimum number of elements is determined by experimentation and can vary from part to part. The purpose and use of the discrete elements will be discussed in detail below.

After this, the program proceeds by line 110 to box 112 where the mechanical properties of the extrusion are entered. These mechanical properties are as follows:

K is the strength coefficient, which is measured in units of pressure such as psi or pa n is the strain hardening exponent, which is unitless R is normal anisotropy parameter which is unitless E is Young's modulus which is measured in units of pressure, such as psi or pa v is Poisson's ratio which is unitless $\sigma_y$ is yield stress, which although not used in the model, is used for pre-processing to determine the elastic/plastic strain and is measured in units of pressure such as psi or pa After entering the above mechanical properties into the program, the program proceeds by line 113 to box 114 where the coefficient of friction between the part and the die (which is unitless) is entered.

The program then proceeds by line 120 to decision box 122 where the program asks whether the extrusion has a constant wall thickness. If the answer is "yes", the program proceeds by line 124 to box 126 where this constant thickness is entered If the answer is "no" the program proceeds by line 128 to box 130 where the local thickness information is entered.

After the thickness is entered, the program proceeds by line 140 to box 142 where the extrusion is actually discritized into N-elements based on the value of N entered at box 100.

Figure 8:
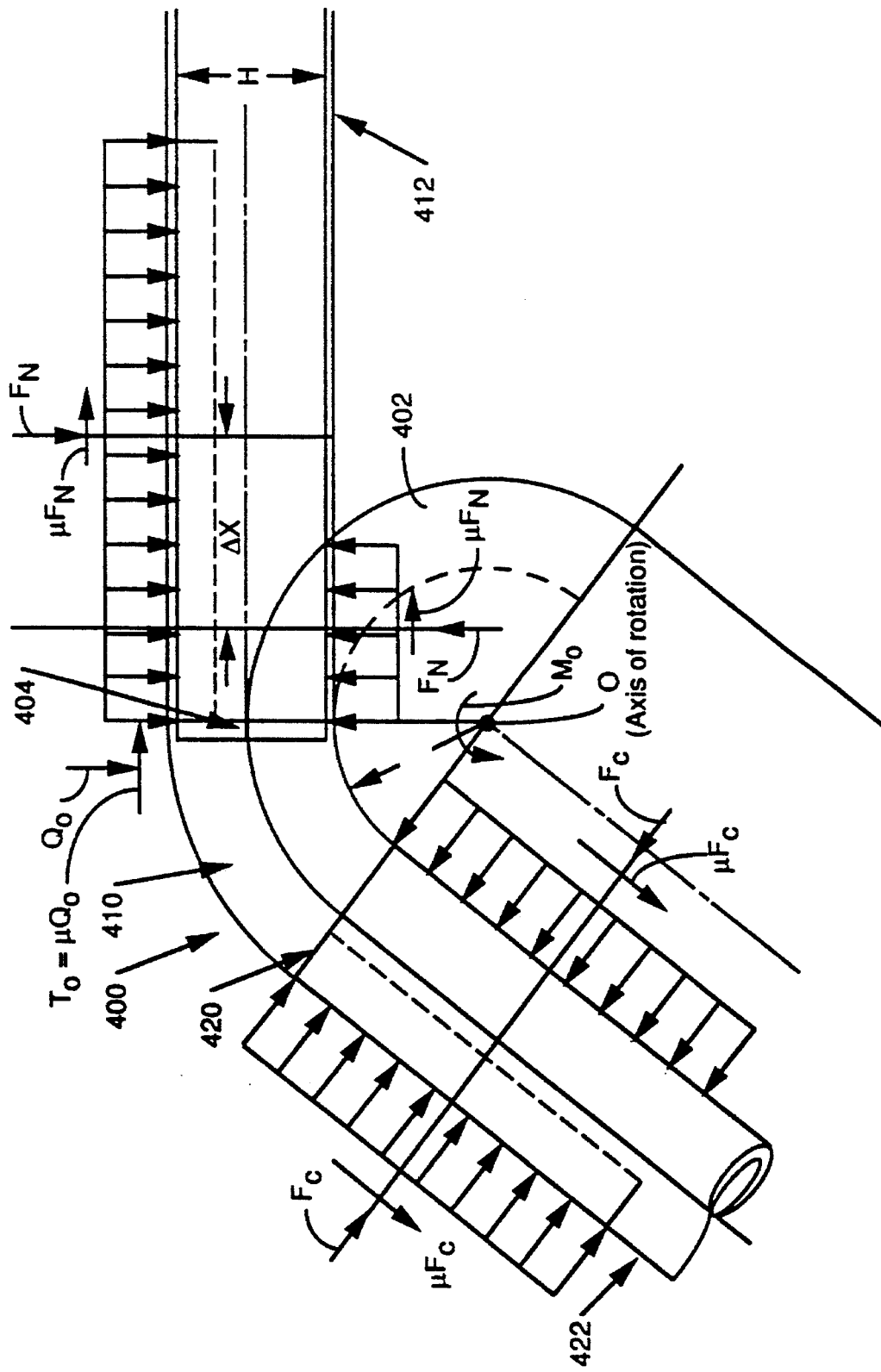
FIG. 8 is a schematic diagram showing the forces on the part during bending.

The program then proceeds by line 150 to box 152 which asks the user to set the boundary conditions. Referring now to FIG. 8, the boundary conditions will be discussed. FIG. 8 shows an extrusion 400 being bent by a rotary bending die 402 that is part of a bending machine (not shown). The right hand boundary 404 is the section between the bent section 410 and the right hand section 412 of the extrusion. It will be appreciated that the right hand section 412 is held in place by pressure holder means (not shown) and as known, the rotary die 402 rotates about axis O to bend the extrusion as is shown in FIG. 8. The left hand boundary 420 is between the left hand section 422 and the bent section 410. As is known, the left hand section is held against the rotating bending die 402 by clamp holder means (not shown). The rotation of the bending die 402 while the extrusion is being held by the clamp holder means draws the extrusion 400 around the die 402 to bend it as shown in FIG. 8. FIG. 8 also shows all of the forces acting on the extrusion 400. These forces will be referred to throughout this specification.

Referring back to FIG. 2, the program proceeds from box 152 by line 160 to box 162 where the measured/calculated right hand boundary tension is entered. This tension value is determined so that the part can be bent efficiently without structural failure. That is, the tension is set at as high a value as possible in order to efficiently bend the part, but not so high as to cause the extrusion to tear and simultaneously to reduce buckling and springback when being bent. This tension is a key value, in that when the part is actually bent on the bending machine of the invention (see below) this tension is desired to be kept generally constant by adjusting other parameters in the bending process.

After this, the program proceeds from box 162 by line 180 to box 182 where the boundary values are set. As this is a two point boundary value type problem, either variation in the tension $\delta T$ or variation in the shear $\delta Q$ at each of the right hand boundary RHB and left hand boundary LHB must be known. These values are entered, and now the program is ready to proceed with the deformation modelling of the bending process.

Figure 3:
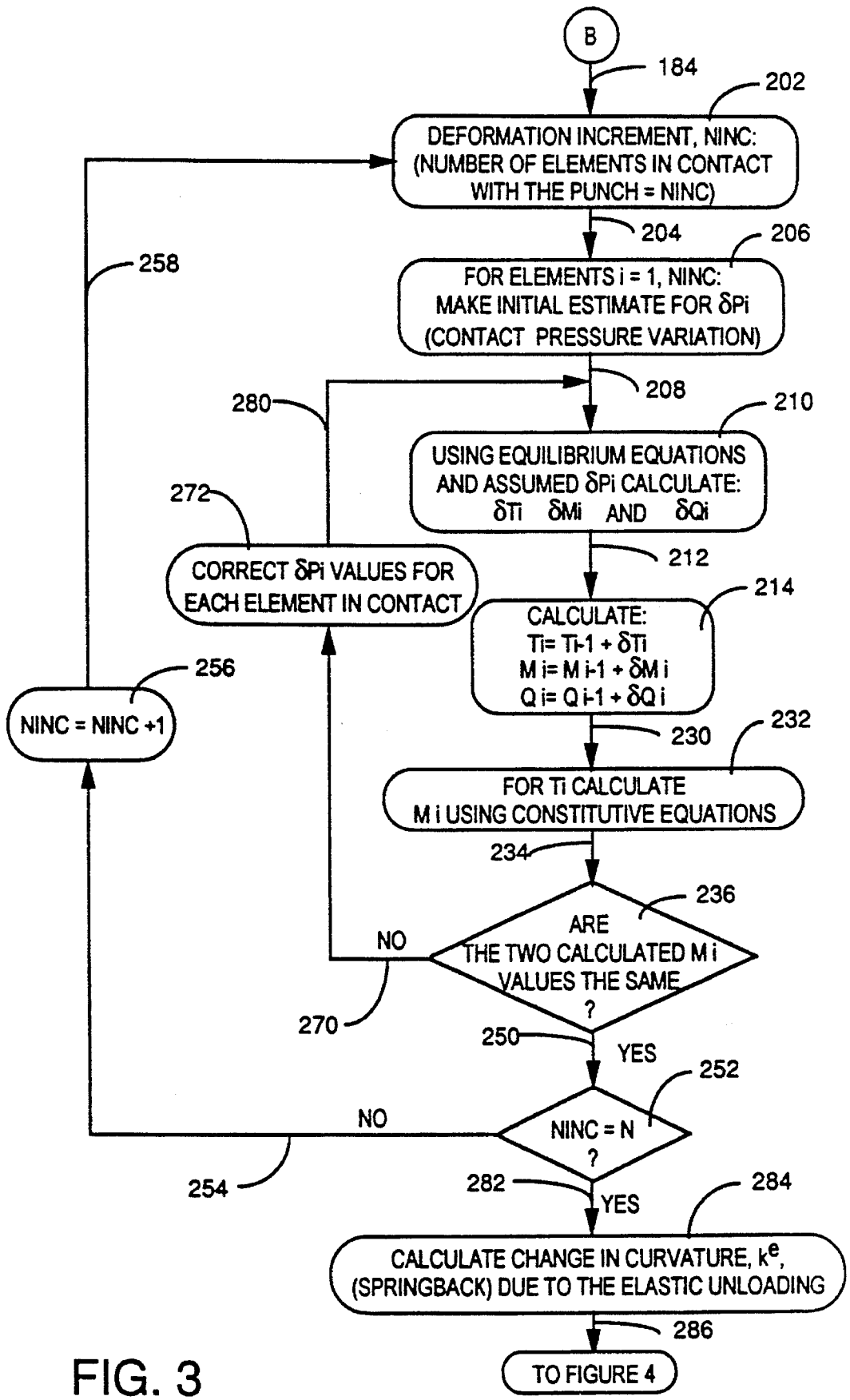
Figure 4:
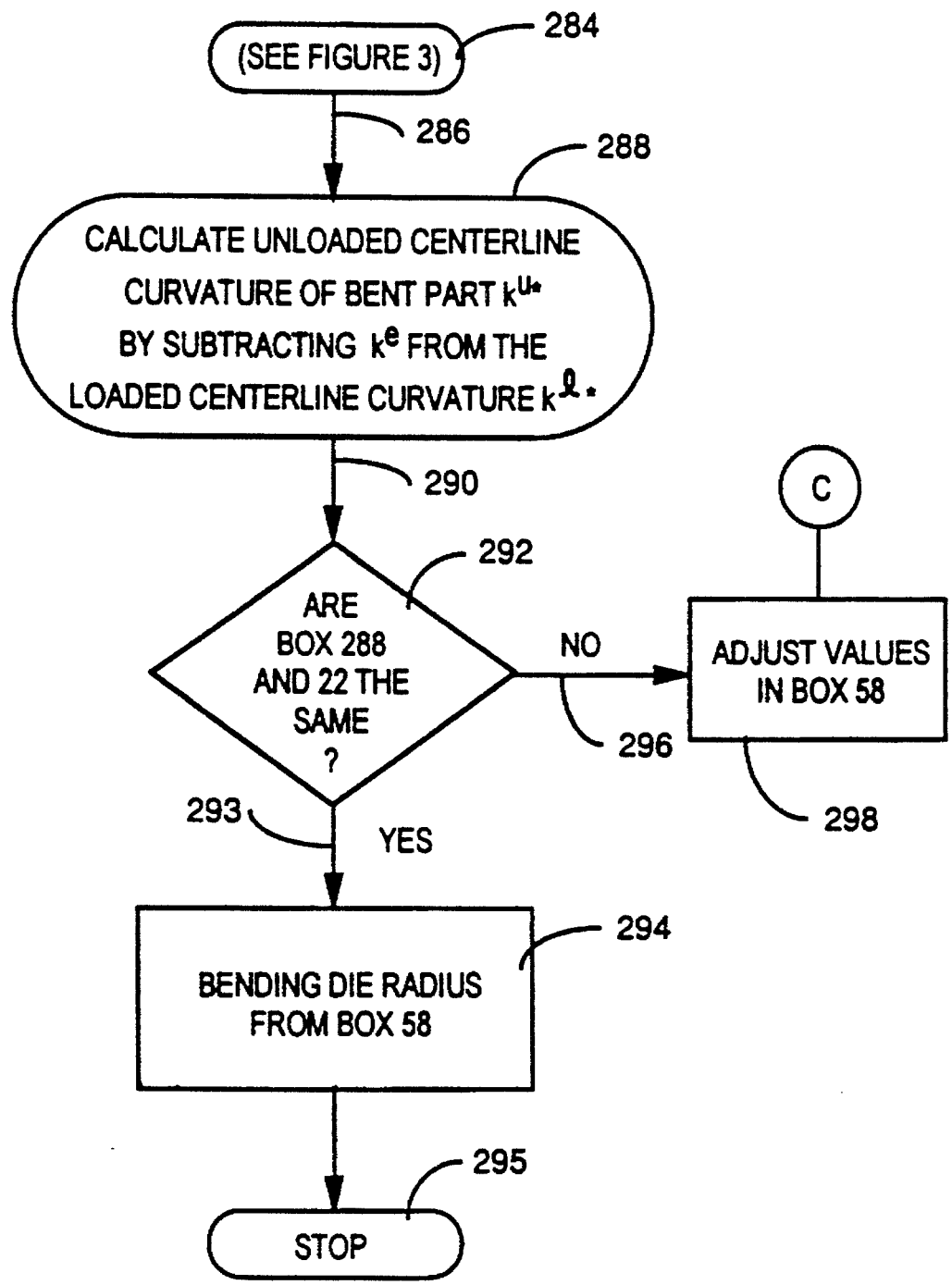
Figure 9:
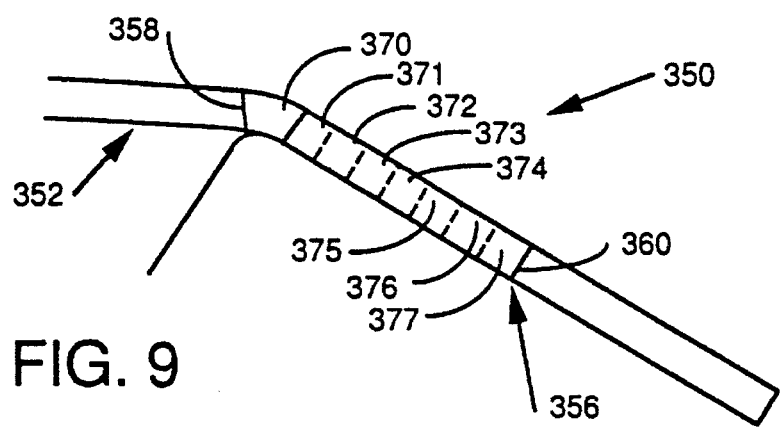
FIG. 9 is a schematic diagram showing the bending die contacting the first element of the part to be bent.

Referring now to FIG. 3, the program proceeds from box 182 by line 184 to box 202 where the deformation subroutine is shown. The purpose of this subroutine in general is to model the bending of the part by determining the deformation of each discritized element (for example 370–377 of FIG. 7) as it is bent by the rotary bending die. Referring to FIG. 9, extrusion 350 is shown which is discritized into eight elements 370, 371, 372, 373, 374, 375, 376 and 377. (See box 100 of the program.) The deformation subroutine calculates the deformation of element 370 as it is being bent by the rotary bending die. It is assumed that when element 370 contacts the die, it "sticks" to its surface without further movement.

Figure 10:
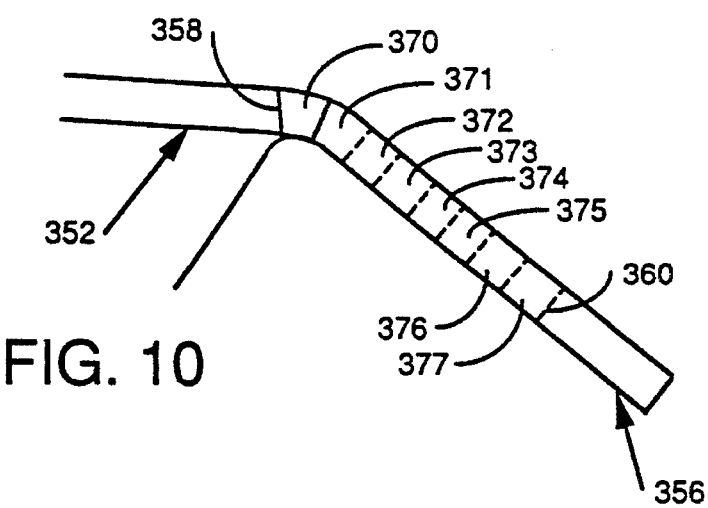
FIG. 10 is a schematic diagram showing the bending die now in contact with the first and second elements of the part to be bent.

Referring to FIG. 10, the die then contacts element 371 and the program calculates the deformation of this element and element 370 again. This procedure repeats until all of the eight elements 370–377 have made contact with the bending die. Thus, for each boundary value problem the deformation of all the elements within the boundaries where the elements are in contact with the bending die is determined.

Referring back now to FIG. 3, the deformation subroutine will be discussed in detail. In box 202, depending upon how many elements, such as elements 370–377, are in contact with the bending die, a value is assigned to NINC. For example, in FIG. 9, NINC would equal one (1) in that only one element, element 370, is initially in contact with the punch. In FIG. 10, NINC would equal two (2) in that two elements, elements 370 and 371, are in contact with the bending die. The program proceeds from box 202 by line 204 to box 206 where the user enters into the program for each element in contact with the die an initial estimate for the contact pressure variation $\delta P_i$, where the subscript i denotes the designated element and where $1 \leq i \leq NINC$. For example, when only element 370 is in contact with the bending die (NINC=1), the contact pressure variation $\delta P_1$ will be entered. Accordingly, when elements 370 and 371 are in contact with the bending die, contact pressure variations $\delta P_1$, $\delta P_2$ for these two elements will be entered.

The program proceeds from box 206 by line 208 to box 210 where equilibrium equations and $\delta P_i$ are used to calculate $\delta T_i$, $\delta M_i$ and $\delta Q_i$. The equilibrium equations are as follows:

$\delta T(i,J) =$ $$\delta T(i,J-1) - \delta p(i,j) \cdot \mu \cdot R_p(j) \cdot A(j) + \delta Q(i,J-1) \cdot A(j)$$

Figure 10A:
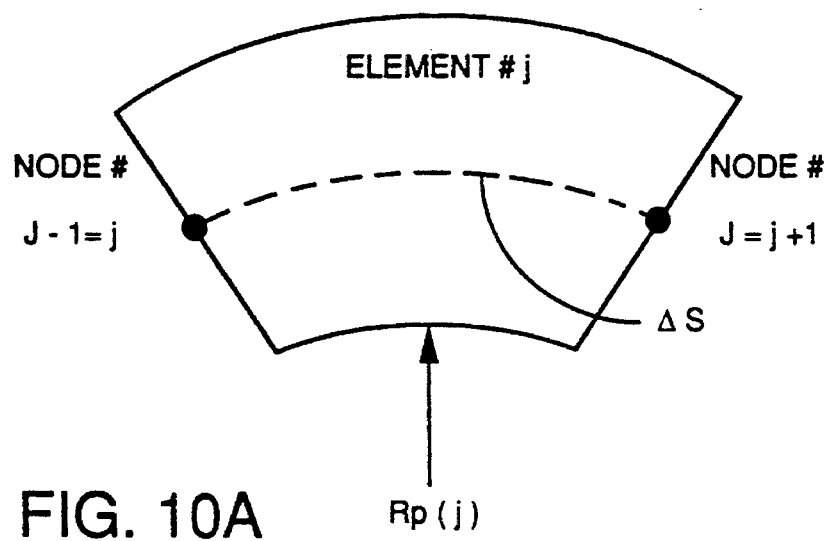
FIG. 10A is a schematic diagram showing a single deformed element.

$\delta Q(i,J) = \delta Q(i,J-1) + \delta p(i,j) \cdot R_p(j) \cdot A(j) - \delta T(i,J-1) \cdot A(j)$ $\delta M(i,J) = \delta M(i,J-1) -$ $$\left\{ \delta Q(i,J-1) \cdot \left[ R_p(j) + \frac{1}{2} H \right] - \frac{H \cdot \mu}{2} \cdot R_p(j) \cdot \delta p(i,j) \right\} A(j)$$

where the subscript i corresponds to the current total number of elements in contact with the bending die, the subscript j corresponds to the element number in question and J=j+1 corresponds to a node number which is shown in FIG. 10A where node number J−1=j on the left side of element j and node number J=j+1 on the right side of element j are shown and where further:

$\delta T$ is the change in tension
$\delta p$ is the change in contact pressure variation
$\mu$ is the coefficient of friction
$R_p$ is the radius of curvature of the bending die and where $$A(j) = \frac{\Delta s(j)}{R_p(j) + \frac{1}{2} H}$$

and $\Delta s$ is the length of the midsurface of the element or the length of the line connecting node J−1=j to j+1=J (See FIG. 10A)

H is the height of the part
$\delta Q$ is the change in shear
$\delta M$ is the change in bending moment.

The above equilibrium equations apply for calculation of $\delta T$, $\delta Q$, $\delta M$ for adjacent nodes (e.g., j and j+1, FIG. 10A) only. But, a boundary value problem having several elements between the boundaries requires an iterative method of forcing the solution of the internal elements to satisfy the known boundary values by such known methods as the "shooting method" known to those skilled in the art.

This problem can be more easily solved once the internal deformation of the elements are written in terms of known boundary values as follows where $2 \leq J \leq i$:

$\delta T(i,J) = C_T(J-1) \cdot \delta T(i,1) +$ $$C_Q(J-1) \cdot \delta Q(i,1) + \sum_{l=1}^{J-1} D_T(J-1,l) \cdot \delta p(i,l)$$

$\delta Q(i,J) = B_T(J-1) \cdot \delta T(i,1) +$ $$B_Q(J-1) \cdot \delta Q(i,1) + \sum_{l=1}^{J-1} D_Q(J-1,l) \cdot \delta p(i,l)$$

where $C_T(J-1)$, $C_Q(J-1)$, $B_T(J-1)$, $B_Q(J-1)$, $D_Q(J-1,l)$ $D_T(J-1,l)$ are recursive expressions defined as follows: for J=1:

$C_T(1) = 1$
$C_Q(1) = A(1)$
$B_T(1) = -A(1)$
$B_Q(1) = 1$ for $2 \leq J \leq N$:
$C_T(J) = C_T(J-1) + B_T(J-1) \cdot A(J)$
$C_Q(J) = C_Q(J-1) + B_Q(J-1) \cdot A(J)$
$B_T(J) = B_T(J-1) - C_T(J-1) \cdot A(J)$ if J = K:   $1 \leq J \leq 2N$:

$D_T(J,K) = -\mu \cdot R_P(J) \cdot A(J)$
$D_Q(J,K) = R_P(J) \cdot A(J)$ if $J \neq K$:   $2 \leq J \leq N$   $1 \leq K \leq J-1$:

$D_T(J,K) = D_T(J-1,K) + D_Q(J-1,K) \cdot A(J)$
$D_Q(J,K) = D_T(J-1,K) \cdot A(J) + D_Q(J-1,K)$.

for $2 \leq J \leq N$:
$C_T(J) = C_T(J-1) + B_T(J-1).A(J)$
$C_Q(J) = C_Q(J-1) + B_Q(J-1).A(J)$
$B_T(J) = B_T(J-1) - C_T(J-1).A(J)$
$B_Q(J) = B_Q(J-1) - C_Q(J-1).A(J)$
if J=K: $i \leq J \leq N$:
$D_T(J,K) = -\mu.R_p(J).A(J)$
$D_Q(J,K) = R_p(J).A(J)$
if $J \neq K$: $2 \leq J \leq N$  $1 \leq K \leq J-1$:
$D_T(J,K) = D_T(J-1,K) + D_Q(J-1,K).A(J)$
$D_Q(J,K) = D_T(J-1,K).A(J) + D_Q(J-1,K)$.

The program then proceeds by line 212 to box 214 where current nodal tension, bending moment and shear, $T_i$, $M_i$ and $Q_i$ are calculated by adding the $T_{i-1}$, $M_{i-1}$ and $Q_{i-1}$ in the previous deformation increment to the calculated $\delta T_i$, $\delta M_i$ and $\delta Q_i$. For example $T_i = T_{i-1} + \delta T_i$ are shown in box 214. When deformation starts and there is only one element 370 in contact with the bending die (NINC=1), (See FIG. 9), there are two nodes, Node 1 and Node 2 defining element 370. For Node 1, the tension is given from box 162 (right hand boundary tension). Bending moment $M_1$ is calculated from $T_i$ and the die geometry and $Q_1$ can be any constant value. It is desired to calculate the tension, bending moment and shear of Node 2. The solution at Node 2 is dependent upon $\delta P_1$ (contact pressure variation) an estimate of which was entered in box 206 and it is used in equilibrium equations to calculate $\delta T_2$, $\delta Q_2$, and $\delta M_2$. These values are then used to calculate $T_2$, $M_2$ and $Q_2$. Thus $T_2 = T_1 + \delta T_2$, $M_2 = M_1 + \delta M_2$ and $Q_2 = Q_1 + \delta Q_2$.

After this, the program proceeds by line 230 to box 232 where $M_i$ is calculated for $T_i$ by using constitutive equations:

$$T(i,J) = \sum_{k=1}^{N} \sigma_T(i,J,K) \cdot \Delta A_0 \cdot \exp[-\epsilon_s(i,J)] \qquad \text{(Equation A)}$$

$$M(i,J) = \sum_{k=1}^{N} \sigma_T(i,J,k) \cdot \Delta A_0 \cdot \exp[-\epsilon_s(i,J)] \cdot \eta(i,k) \qquad \text{(Equation B)}$$

where $$\epsilon_T(i,J,k) = \frac{\xi(i,k)}{\left[ R_p(j) + \frac{1}{2} H \right]} + \epsilon_s(i,J)$$

$$\sigma_T(i,J,k) = K \left[ \sqrt{\frac{1+R}{1+2R}} \right]^{n+1} \cdot \epsilon_T{}^n(i,J,k)$$

where i corresponds to the number of elements in contact with the bending die; j corresponds to element number, see FIG. 9 which shows one element in the bent area or FIG. 10 which shows two elements in the bent area ($i \leq j \leq N$); J is the node number (See FIG. 10A); and k corresponds to cross-sectional element number, see FIG. 5, for example element 288 in FIG. 5.

And where

T is tension $\sigma_T$ is tangential stress in units of pressure such as psi or pa $\Delta A_o$ is the original area of a cross-sectional element such as element 288 in FIG. 5

$\epsilon_s$ is the stretching strain applied to an element's cross-section which is unitless $\eta, \xi$ are a local coordinate axes, see FIG. 5

$\epsilon_T$ is tangential strain (unitless)

$R_p$ is the bending die radius

H is the height of the extrusion

K is the strength coefficient in units of pressure such as psi or pa.

It will be appreciated that the equilibrium equations for $\delta M$, $\delta Q$ and $\delta T$, calculated in box 210, are due to external forces whereas those calculated in box 232 are due to internal stresses and strains and assumed constitutive equations. Under conservation of energy principles these forces must be equal to each other in order to correctly model the bending process. Thus, the program proceeds from box 232 by line 234 to decision box 236 where the $M_i$ values calculated in box 232 are compared to the $M_i$ values calculated in box 214. If the difference between their values are within an acceptable tolerance of each other, the program proceeds by line 250 to decision box 252 where the program asks if all the elements (i.e., elements 370–377) have made contact with the bending die. If not, the program proceeds by line 254 to box 256 where the NINC counter is incremented by one, and then, by line 258, the deformation subroutine repeats again, until all elements have made contact with the bending die, i.e., N=NINC.

If the difference between the calculated $M_i$ values are not within an acceptable tolerance, the program proceeds by line 270 to box 272 where the $\delta P_i$ contact pressure variations are adjusted using the Newton-Raphson method, which is well known to those skilled in the art. After this, the program proceeds by line 280 back to box 210 where the external forces are again calculated and the process repeated until $M_i$ values are in the proper tolerance range.

After all of the elements have been deformed (NINC=N) the program proceeds by line 282 to box 284 where springback due to the elastic unloading of the part is calculated. Using the elastic properties of the extrusion, E and v, and the deformed geometry of the bent extrusion, the elastic curvature for each element $k^e$ is calculated using the following equations:

$$\epsilon_T{}^e(i,J,k) = \xi(i,k) \cdot k^e(j) + \epsilon_s{}^e(i,J)$$

$$\sigma_T{}^e(i,J,k) = \frac{E}{(1-v^2)} \cdot \epsilon_T{}^e(i,J,k)$$

where the superscript e, corresponds to elastic solution for calculating springback After this, using the elastic stresses and strains, these values are substituted into Equations A and B (page 16, lines 4 and 5) to calculate $T_i$ and $M_i$. Then the $T_i$ and $M_i$ are compared to those calculated by the plasticity equations. If these are equal, there is a solution and $k^e$ will be the amount of change in centerline curvature of the part due to springback, which is determined in box 284. The program then proceeds by line 286 to box 288 where the unloaded centerline curvature of the bent part ($k^{u*}$) is calculated by subtracting $k^e$ from the loaded centerline curvature ($k^{l*}$) which is equal to:

$$k^{l*} = \frac{1}{R_p + \frac{H}{2}}$$

where $R_p$ was given in box 58 and H was taken from box 72.

The program then proceeds by line 290 to decision box 292 where the unloaded centerline curvature of the bent part calculated in box 288 is compared to the desired unloaded centerline curvature which was entered in box 22. If these values are with an acceptable tolerance range determined by the user (and which may vary according to circumstances) the initial estimate of the bending die radius entered in box 58 was correct, and thus the program proceeds by line 293 to box 294 where the desired bending die radius is the value of the initial bending die radius inputted at box 58, as is indicated at box 294. This value is outputted to the user. After this the program stops at box 295.

If the comparison is not within acceptable tolerance limits, the program proceeds by line 296 to box 298 to adjust the value of the bending die radius $R_p$ entered into box 58 and the program begins from that point (FIG. 1). The adjustment in box 298 is done by calculating the percentage change in curvature from the initial guess in box 58 as follows:

$$c = \frac{k^{l*} - k^{u*}}{k^{l*}} \times 100$$

then the adjusted initial estimate of the bending die radius, $R_{p(adj)}$ to be used in box 58 is calculated as follows:

$$R_{P(adj)} = \frac{1}{k^u \cdot (1+c)} - \frac{H}{2}$$

where $k^u$ is the desired unloaded centerline curvature entered in box 22

Once of the adjusted initial estimate of the bending die radius ($R_{p(adj)}$) is determined, it is entered into the computer at box 58 and the program then calculates the deformation of the part based on that adjusted initial estimate of the bending die radius $R_{p(adj)}$ and the program repeats from there. If the comparison again is not within acceptable tolerance limits, the same adjustment steps are done, with this method repeating until the $R_p$ is found to be within acceptable tolerance limits. Once the $R_p$ is found to be in acceptable tolerance limits, this is the bending die radius that is used to make the bending die for use in the bending machine to bend the extrusion to the desired configuration as shown in box 294. After this, the program stops at box 295.

It will be appreciated that by modelling the bending process, a bending machine bending die can be designed on the computer and process parameters calculated so that costly preproduction die proofing can be avoided. Once the die geometrics are determined, means for manufacturing the bending die, such as a machine for actually producing the bending die, can be employed to make the actual die used in the bending machine.

Figure 11:
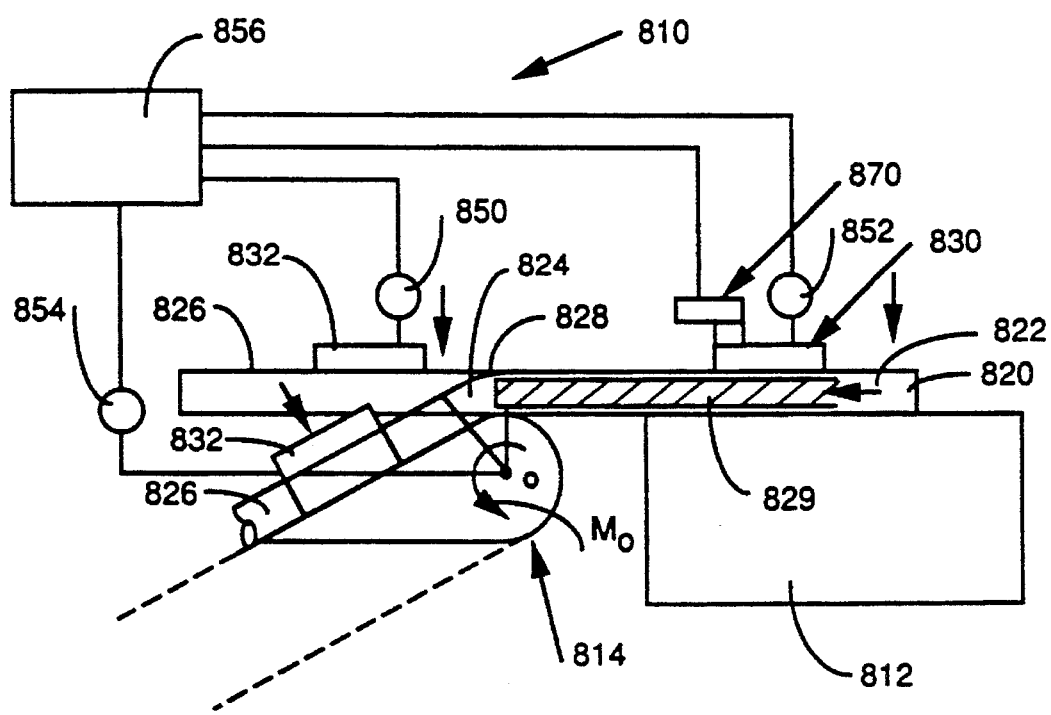
FIG. 11 is a schematic diagram of the improved bending machine of the invention.

The bending machine of the invention, with a bending die designed by the above method is shown in schematic form in FIG. 11. The machine 810 consists of a stationary portion 812 and bending die 814. The bending die 814 rotates about axis O, as is shown in phantom line drawing. The extrusion 820 to be bent is shown mounted in the machine 810 and the extrusion 820 consists of a first end section 822, an intermediate section 824 and a second end section 826. A right hand boundary section 828 is formed between the first end section 822 and the intermediate section 824. It will be appreciated that a mandrel or plug 829 is placed inside the first end section 822 of the extrusion 820 in order to maintain the structural integrity of the extrusion during bending.

In use, a pressure holder means 830 clamps a portion of the first end section 822 to the stationary portion 812 and the clamping means 832 clamps a portion of the second end section 826 to the bending die 814. Thus, when the bending die 814 is rotated, a portion of the extrusion 820 will move along with the bending die causing the bend to be formed around the bending die 814 as is shown in phantom line drawing in FIG. 11.

The bending machine also includes a load cell 850 to measure the clamping force ($F_c$) of clamping means 832 and a load cell 852 to measure the pressure holder force ($F_N$) of the pressure holder means 830. The torque ($M_o$) generated by the rotary bending die 814 is also measured by a torque measuring device 854.

In accordance with the invention, a desired tension of the right hand boundary is selected and inputted into the computer 856. When the bending die starts to move, the measured values for $F_c$, $F_N$ and $M_o$ are inputted into the computer and a $M_o^{cal}$ is calculated $M_o^{cal}$ is calculated based on the following equation:

$$M_0^{cal} = M^* + T^* \left( R_p + \frac{H}{2} \right)$$

where
$M^*$ is bending moment at the boundary calculated from $T^*$
$T^*$ is boundary tension provided in box 162
$R_p$ is the bending die radius
$H$ is the height of the extrusion If the $M_o^{cal}$ varies by more than a specified amount from the measured torque $M_o$, the computer outputs an adjusting signal to a linear position controller 870. If the $M_o^{cal}$ is greater than the $M_o$, the computer 856 outputs a pressure reduce signal to the linear position controller 870 which causes the pressure holder means 830 to exert a lesser amount of pressure holder force on the first end section of the extrusion. If the $M_o^{cal}$ is less than the $M_o$, the computer 856 outputs a pressure increase signal to the linear position controller 870 which causes the pressure holder means 830 to exert a greater holder force on the first end section. In this way, the tension of the boundary is always controlled, and the bending process will duplicate the process as it was modelled in the computer program 20 discussed above.

The method of the invention involves bending a part having a first end section and a second end section and including a boundary section between said first end section and said intermediate section. The method comprises: providing a rotary draw bending machine including bending die means and a stationary portion with the bending die means adapted to rotate relative to said stationary portion. The method further comprises clamping at least a portion of the first end section of the part against the stationary portion, the clamping creating a pressure holder force ($F_N$) and also clamping at least a portion of the second end section of the part against the bending die means, the clamping creating a clamping force ($F_c$). The method then comprises rotating the bending die means relative to the stationary portion, the rotating creating a torque ($M_o$) and during rotation of the bending die means, adjusting the $F_N$. In this way, the part is bent to a desired configuration.

It will be appreciated that a method for determining the radius of a bending die for use with a bending machine for bending a part and an associated apparatus and an improved bending machine and a method of bending a part is provided.

While specific embodiments of the invention have been disclosed, it will be appreciated by those skilled in the art that various modifications and alterations to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A rotary draw bending machine for bending a part having a first end section, an intermediate section and a second end section and including a boundary section between said first end section and said intermediate section, said bending machine comprising:

a stationary portion;

bending die means adapted to rotate relative to said stationary portion, said bending die means generating a torque;

pressure holder means for holding at least a portion of said first end section against said stationary portion by applying a pressure holder force on said first end section;

clamp holder means for holding at least a portion of said second end section against said bending die means by applying a clamping force on said second end section; and means for adjusting said pressure holder force based on said torque so that the tension in said boundary section is controlled, whereby said part is bent to a desired configuration.

2. A rotary draw bending machine for bending a part having a first end section, an intermediate section and a second end section and including a boundary section between said first end section and said intermediate section, said bending machine comprising:

a stationary portion;

bending die means adapted to rotate relative to said stationary portion, said bending die means generating a torque;

pressure holder means for holding at least a portion of said first end section against said stationary portion by applying a pressure holder force on said first end section;

clamp holder means for holding at least a portion of said second end section against said bending die means by applying a clamping force on said second end section;

means for adjusting said pressure holder force while maintaining a substantially constant tension at said boundary section, whereby said part is bent to a desired configuration; and said adjusting means comprises
means for measuring said pressure holder force;
means for measuring said clamping force;
means for measuring said torque; and
computer means for (i) receiving said pressure holder force, said clamping force and said torque measurements; (ii) storing a computer program for calculating a value for $M_o^{cal}$ from an equation describing moments and forces on said part as said part is bent by said bending machine; and (iii) outputting an adjusting signal when said $M_o^{cal}$ varies by a greater than specified amount from said measured torque.

3. The machine of claim 2, wherein
said pressure holder force measuring means is a load cell.

4. The machine of claim 3, wherein
said clamping force measuring means is a load cell.

5. The machine of claim 2, wherein
said computer program has means for calculating said $M_o^{cal}$ based on said equation as follows:

$$M_0^{cal} = M^* + T^* \left( R_p + \frac{H}{2} \right)$$

where $M^s$ is bending moment at said boundary section calculated from $T^*$ $T^*$ is the tension at said boundary section $R_p$ is the bending die radius H is the height of said part.

6. The machine of claim 2, including
linear position controller means operatively associated with said pressure holder means for receiving said adjusting signal and adjusting said pressure holder force exerted by said pressure holder means on said part based on said adjusting signal.

7. The machine of claim 6, wherein
said computer program has means for outputting a pressure reduce signal if said $M_o^{cal}$ is greater than said measured torque; and said linear position controller means has means for receiving said pressure reduce signal and causing said pressure holder means to exert a lesser amount of pressure holder force on said first end section than the amount of said pressure holder force applied on said first end section before said pressure reduce signal is outputted based on said pressure reduce signal.

8. The machine of claim 7, wherein
said computer program has means for outputting a pressure increase signal if said $M_o^{cal}$ is less than said measured torque; and said linear position controller means has means for receiving said pressure increase signal and causing said pressure holder means to exert a greater amount of said pressure holder force on said first end section than the amount of said pressure holder force applied on said first end section before said pressure increase signal is outputted based on said pressure increase signal.

9. A method of bending a part having a first end section, an intermediate section and a second end section and including a boundary section between said first end section and said intermediate section, said method comprising:

providing a rotary draw bending machine including bending die means and a stationary portion, said bending die means adapted to rotate relative to said stationary portion;

clamping at least a portion of said first end section of said part against said stationary portion, said clamping creating a pressure holder force;

clamping at least a portion of said second end section of said part against said bending die means, said clamping creating a clamping force;

rotating said bending die means relative to said stationary portion, said rotating creating a torque; and during rotation of said bending die means, adjusting said pressure holder force based on said torque so that the tension in said boundary section is controlled, whereby said part is bent to a desired configuration.

10. The method of claim 9, including
adjusting said pressure holder force to maintain a substantially constant tension at said boundary section.

11. A method of bending a part having a first end section, an intermediate section and a second end section and including a boundary section between said first end section and said intermediate section, said method comprising:

providing a rotary draw bending machine including bending die means and a stationary portion, said bending die means adapted to rotate relative to said stationary portion;

clamping at least a portion of said first end section of said part against said stationary portion, said clamping creating a pressure holder force;

clamping at least a portion of said second end section of said part against said bending die means, said clamping creating a clamping force;

rotating said bending die means relative to said stationary portion, said rotating creating a torque;

during rotation of said bending die means, adjusting said pressure holder force, whereby said part is bent to a desired configuration;

adjusting said pressure holder force to maintain a substantially constant tension at said boundary section; and providing means for measuring said pressure holder force, said clamping force and said torque, said measuring means providing measured values for said pressure holder force, said clamping force and said torque.

12. The method of claim 11, including
inputting said measured values of said pressure holder force, said clamping force and said torque and a value for said constant tension into a computer program stored in a computer; and calculating a value for $M_o^{cal}$.

13. The method of claim 12, including
calculating $M_o^{cal}$ using the following equation $$M_0^{cal} = M^* + T^* \left( R_p + \frac{H}{2} \right)$$

where $M^*$ is bending moment at said boundary section calculated from $T^*$ $T^*$ is the tension at said boundary section $R_p$ is the bending die radius H is the height of said part.

14. The method of claim 13, including
comparing said value of said $M_o^{cal}$ to said measured value of said torque.

15. The method of claim 14, including
if said value of said $M_o^{cal}$ varies by greater than a specified amount from said measured torque, adjusting said pressure holder force.

16. The method of claim 15, including
if $M_o^{cal}$ is greater than said measured torque, reducing said pressure holder force.

17. The method of claim 15, including
if $M_o^{cal}$ is less than said measured torque, increasing said pressure holder force.

18. The method of claim 17, including providing pressure holder means to clamp said first end section;

providing a linear position controller means operatively associated with said pressure holder means; and adjusting said pressure holder force by means of said linear position controller means.

19. The method of claim 18, including employing said computer to output an adjusting signal to be received by said linear position controller means when said $M_o^{cal}$ varies by a greater than a specified amount from said measured torque.

* * * * *

UNITED STATES PATENT AND TRADEMARK OFFICE
CERTIFICATE OF CORRECTION

PATENT NO. : 5,519,623
DATED : May 21, 1996
INVENTOR(S) : Farhang Pourboghrat

It is certified that error appears in the above-identified patent and that said Letters Patent is hereby corrected as shown below:

Col. 13, line 19, Claim 5    Before is, delete "$M^8$" and insert --$M^*$--.

Signed and Sealed this

Third Day of March, 1998

Attest:

BRUCE LEHMAN

Attesting Officer    Commissioner of Patents and Trademarks